US006542158B2

(12) United States Patent
Cronin et al.

(10) Patent No.: US 6,542,158 B2
(45) Date of Patent: *Apr. 1, 2003

(54) DELIVERING ANIMATION OVER THE INTERNET

(75) Inventors: Thomas M. Cronin, Beaverton, OR (US); Michael D. Rosenzweig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/044,545

(22) Filed: Jan. 11, 2002

(65) Prior Publication Data

US 2002/0060664 A1 May 23, 2002

Related U.S. Application Data

(63) Continuation of application No. 09/150,868, filed on Sep. 10, 1998.

(51) Int. Cl.[7] .............................................. G06T 15/70
(52) U.S. Cl. ....................................................... 345/473
(58) Field of Search ................................. 345/473, 474, 345/475

(56) References Cited

U.S. PATENT DOCUMENTS

| | | | |
|---|---|---|---|
| 3,747,087 A | * | 7/1973 | Harrison et al. ............... 345/22 |
| 5,519,825 A | | 5/1996 | Naughton et al. |
| 5,590,261 A | * | 12/1996 | Sclaroff et al. ............... 345/473 |
| 5,628,012 A | | 5/1997 | Libkin |
| 5,655,067 A | | 8/1997 | Takahashi et al. |
| 5,706,417 A | | 1/1998 | Adelson |
| 5,719,786 A | | 2/1998 | Nelson et al. |
| 5,867,175 A | | 2/1999 | Katzenberger et al. |
| 6,369,822 B1 | * | 4/2002 | Peevers et al. ............... 345/473 |
| 6,392,652 B1 | * | 5/2002 | Cronin et al. ............... 345/473 |

OTHER PUBLICATIONS

Ken Perlin, An Image Synthesizer. Computer Graphics, SIGGRAPH, Jul. 22–26, 1985. vol. 19, No. 3.

ZDNet: Web Animation Creation. Jan Ouzer and Luisa Simone, PC Magazine. Web Page [online]. Dec. 18, 1998 [retrieved on Jul. 31, 2001] Retrieved from the Internet:<URL:http://zdnet.com/products/stories/reviews/0,4161,333092,00.html. pp. 1–4.

Press Release—Intel Expands Web Developer Product Line Web Page [online]. Los Angeles, Mar. 11, 1998. [retrieved on Jul. 25, 2000] Retrieved from the Internet:<URL:http://www.developer.intel.com/pressroom/archive/releases/IN31198B.HTM. pp. 1–3.

Press Release—Intel Unveils New Multimedia Software for Internet Web Pages [online] Hillsboro, Oregon, Aug. 5, 1997. [retrieved Jul. 25, 2001] Retrieved from the Internet:<URL: http://www.developer.intel.com/pressroom/archive/releases/IN080597.HTM. pp. 1–2.

Charles Mirho, Procedural Textures Bring Nature to Internet Explorer. Microsoft Interactive Developer, Jan. 1998. [retrieved on Jun. 12, 2001] Retrieved from the Internet:<URL: http://www.microsoft.com/mind/0198/proctext.htm. pp. 1–6.

* cited by examiner

Primary Examiner—Mark Zimmerman
Assistant Examiner—Enrique L Santiago
(74) Attorney, Agent, or Firm—Blakely, Sokoloff, Taylor & Zafman LLP

(57) ABSTRACT

A method for delivering animation includes transmitting a single source image to a client system. Parameters that generate a function are transmitted to the client system. Modulation frames are generated with the function. The modulation frames are applied to the single source image to generate the animation.

41 Claims, 6 Drawing Sheets

DELIVERING ANIMATION OVER THE INTERNET

This application is a Continuation of application Ser. No. 09/150,868, entitled *A Method and Apparatus For Delivering Animation Over The Internet*, and filed on Sep. 10, 1998.

FIELD OF THE INVENTION

The present invention relates to the field of image processing. More specifically, the present invention relates to a method and apparatus for delivering animation over the Internet.

BACKGROUND OF THE INVENTION

The Internet and the World-Wide Web have become an expansive backbone of communication with a vast repository of information. The Internet and the World-Wide Web has also become a source of advertising for many companies. Web page advertising offers advantages over traditional forms of advertising. Web page advertising is attractive because it enables businesses to reach a large audience and create an impressive presence. Information presented on web pages can be more in-depth than that which can be presented over more traditional advertising media. In addition, the cost of web page advertisement may be less than the cost of other forms of advertisement.

Web pages may include information formatted in simple text, audio, graphics, and video. Web pages are often decorated with various multimedia presentations to make it more attractive to viewers. Among the various multimedia presentation forms used by web page designers, animation has become popular. Animation has typically been implemented by web page designers with animated graphics interchange format (GIFs) or Java applets. Animated GIFs are a type of GIF image that can be animated by combining several images into a single GIF file. Java applets are programs designed to be executed from within another application that may include animated effects.

Delivering animation over the Internet using animated GIFs and Java applets has several drawbacks. In order to access GIF files or Java applets, considerable download time may be required by a web browse to download the plurality of images in the GIF file or the lines of code in the Java applet. In addition, animated GIFs provide only a defined number of pre-generated animated cells that must be repeated over and over.

SUMMARY OF THE INVENTION

A method for delivering animation is disclosed. A single source image is transmitted to the client system. Parameters that generate a function are transmitted to the client system. Modulation frames are generated with the function. The modulation frames are applied to the single source image to generate the animation.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
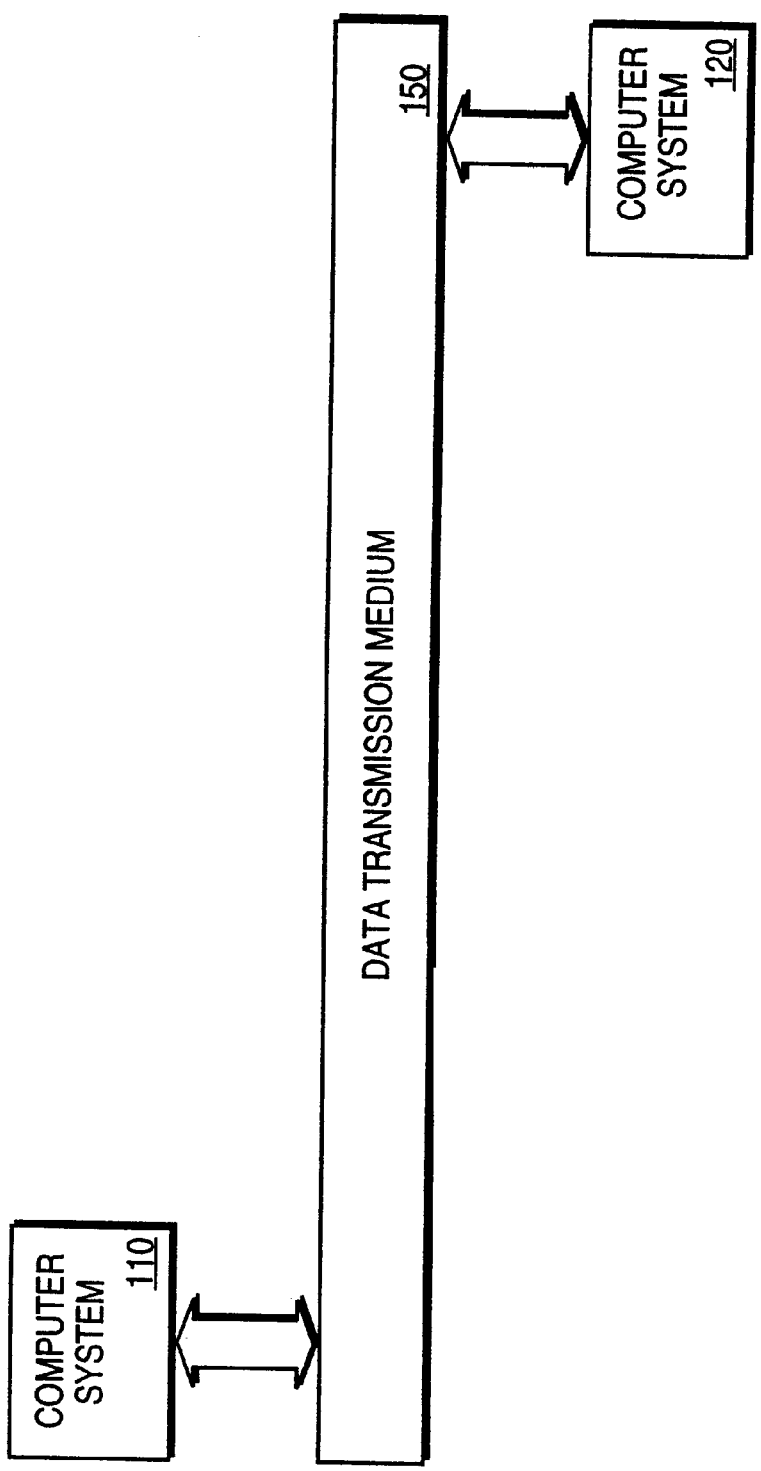
FIG. 1 is a block diagram of a network of computer systems implementing an embodiment of the present invention.

FIG. 1 is a block diagram of a network 100 implementing an embodiment of the present invention. The network includes a first computer system 110 at a first location and a second computer system 120 at a second location. The first computer system 110 and the second computer system 120 are coupled to a transmission medium 150. The first computer system 110 and the second computer system 120 transmit data to each other via the data transmission medium 150. The transmission medium 150 may be one or a combination of fiber optics, cable, twisted pair, microwave, or other media. The transmission medium 150 may be implemented to support an internal network connection, an Internet connection, or other connections. The first computer system 110 may interface with the second computer system 120 via the transmission medium 150 to obtain files.

According to an embodiment of the present invention, the second computer system 120 is a HyperText Transfer Protocol (HTTP) server that stores Hyper Text Markup Language (HTML) files. The second computer system 120 has an Internet domain name and includes HTML files that have an Uniform Resource Locator (URL). An URL includes the file's name, preceded by a hierarchy of directory names in which the file is stored, the Internet domain name of the second computer system 120, and the software and manner by which a web browser (not shown) on the first computer system 110 and the second computer system 120 communicate to exchange the file.

The file transmitted to the first computer system 110 from the second computer system 120 includes animation data that may be used by the first computer system 110 to create and display animation. The animation is created by generating a plurality of animation frames. An animation frame is generated by generating a function using parameters in the animation data, generating a modulation frame with the function, and applying the modulation frame to a single source image in the animation data. A function may be generated from the parameters that may generate an infinite number of unique modulation frames. The bandwidth required for transmitting the animation data is low since the animation data need only include parameters for generating the function and a single source image.

Figure 2:
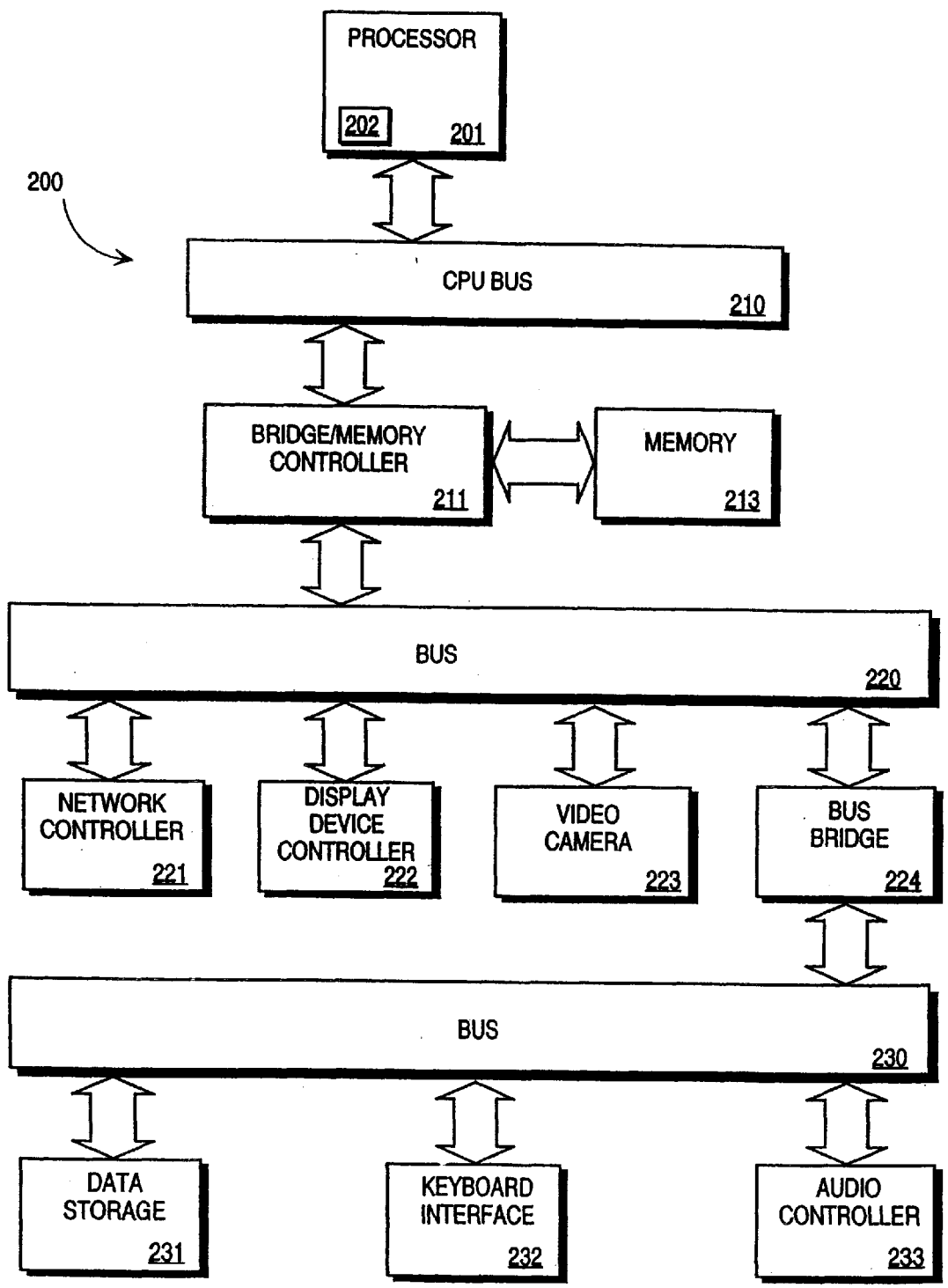
FIG. 2 is a block diagram of a computer system implementing an embodiment of the present invention.

FIG. 2 is a block diagram of a computer system 200 upon which an embodiment of the present invention can be implemented. The computer system 200 may be implemented as the first computer system 110 or the second computer system 120 shown in FIG. 1. The computer system 200 includes a processor 201 that processes data signals. The processor 201 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210 that transmits data signals between processor 201 and other components in the computer system 200.

The computer system 200 includes a memory 213. The memory 213 may be a dynamic random access memory (DRAM) device, a static random access memory (SRAM) device, or other memory device. The memory 213 may store instructions and code represented by data signals that may be executed by the processor 201. A cache memory 202 resides inside processor 201 that stores data signals stored in memory 213. The cache 202 speeds up memory accesses by the processor 201 by taking advantage of its locality of access. In an alternate embodiment of the computer system 200, the cache 202 resides external to the processor 201.

A bridge memory controller 211 is coupled to the CPU bus 210 and the memory 213. The bridge memory controller 211 directs data signals between the processor 201, the memory 213, and other components in the computer system 200 and bridges the data signals between the CPU bus 210, the memory 213, and a first I/O bus 220.

The first I/O bus 220 may be a single bus or a combination of multiple buses. As an example, the first I/O bus 220 may comprise a Peripheral Component Interconnect (PCI) bus, a Personal Computer Memory Card International Association (PCMCIA) bus, a NuBus, or other buses. The first I/O bus 220 provides communication links between components in the computer system 200. A network controller 221 is coupled to the first I/O bus 220. The network controller 221 links the computer system 200 to a network of computers (not shown in FIG. 2) and supports communication among the machines. A display device controller 222 is coupled to the first I/O bus 220. The display device controller 222 allows coupling of a display device to the computer system 200 and acts as an interface between the display device and the computer system 200. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200. A video camera 223 is coupled to the first I/O bus 220. The video camera 223 operates to capture an image of an object. The video camera 223 may be a digital video camera having internal digital video capture hardware that translates the captured image into digital graphical data. The video camera 223 may be an analog video camera having digital video capture hardware external to the video camera 223 for digitizing the captured image.

A second I/O bus 230 may be a single bus or a combination of multiple buses. As an example, the second I/O bus 230 may comprise a PCI bus, a PCMCIA bus, a NuBus, an Industry Standard Architecture (ISA) bus, or other buses. The second I/O bus 230 provides communication links between components in the computer system 200. A data storage device 231 is coupled to the second I/O bus 230. The data storage device 231 may be a hard disk drive, a floppy disk drive, a CD-ROM device, a flash memory device or other mass storage device. A keyboard interface 232 is coupled to the second I/O bus 230. The keyboard interface 232 may be a keyboard controller or other keyboard interface. The keyboard interface 232 may be a dedicated device or can reside in another device such as a bus controller or other controller. The keyboard interface 232 allows coupling of a keyboard to the computer system 200 and transmits data signals from a keyboard to the computer system 200. An audio controller 233 is coupled to the second I/O bus 230. The audio controller 233 operates to coordinate the recording and playing of sounds.

A bus bridge 224 couples the first I/O bus 220 to the second I/O bus 230. The bus bridge 224 operates to buffer and bridge data signals between the first I/O bus 220 and the second I/O bus 230.

The present invention is related to the use of the computer system 200 to generate animation. According to one embodiment, generating animation is performed by the computer system 200 in response to the processor 201 executing a sequence of instructions in main memory 213. Such instructions may be read into memory 213 from another computer-readable medium, such as data storage device 231, or from another source via the network controller 221. Execution of the sequence of instructions causes the processor 201 to generate animation, as will be described hereafter. In an alternative embodiment, hardware circuitry may be used in place of or in combination with software instructions to implement the present invention. Thus, the present invention is not limited to any specific combination of hardware circuitry and software.

Figure 3:
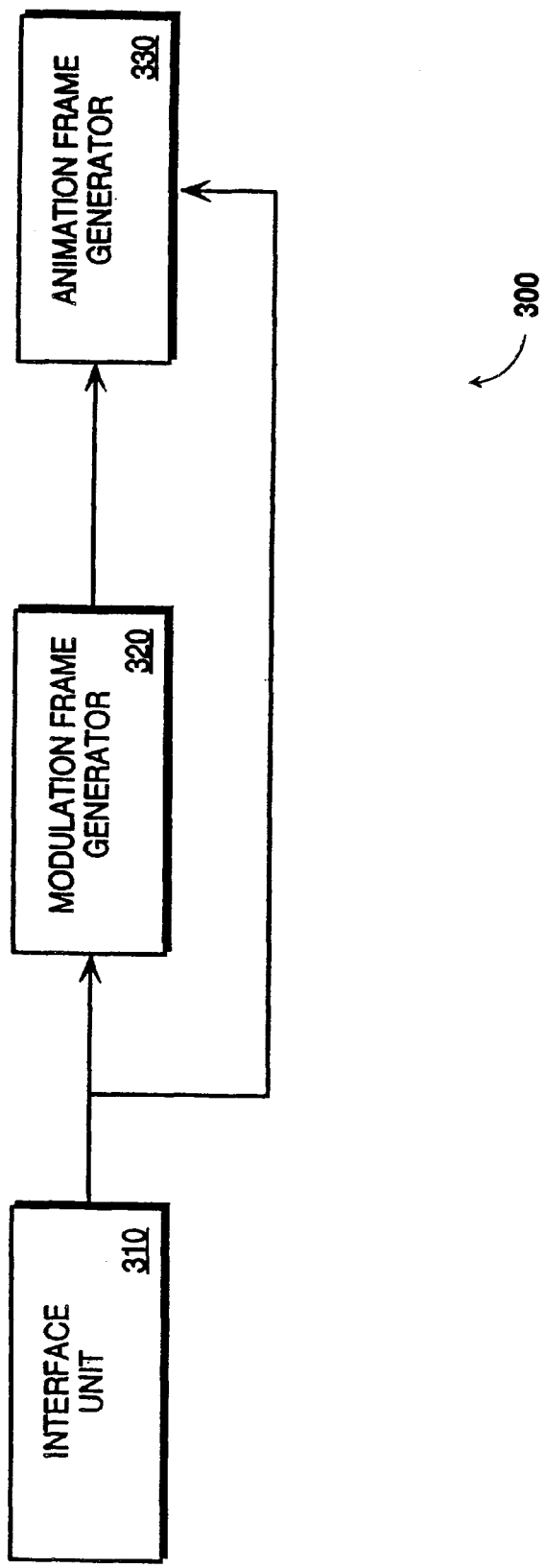
FIG. 3 is a block diagram of an animation effect unit according to an embodiment of the present invention.

FIG. 3 is a block diagram illustrating modules implementing an animation effect unit 300 that generates animation according to an embodiment of the present invention. In a preferred embodiment of the present invention, the modules are implemented in software and reside in main memory 213 (shown in FIG. 2) of the first computer system 110 (shown in FIG. 1) as sequences of instructions. It should be appreciated that the modules may be implemented by hardware as components coupled to the bus 220 (shown in FIG. 2) or a combination of both hardware and software. The animation effect unit 300 includes an interface unit 310. The interface unit 310 interfaces with a web browser in the first computer system 110 (shown in FIG. 1). The interface unit 310 receives animation data and instructions to generate an animation frame from the web browser. The animation data may include parameters for generating a function. The animation data may also include a single source image that may be used as a seed image to generate an animation frame.

A modulation frame generator 320 is coupled to the interface unit 310. The modulation frame generator 320 receives the parameters from the interface unit 310. Upon receiving instructions to generate an animation frame, the modulation frame generator 320 generates a function with the parameters and uses the function to generate modulation frames. According to an embodiment of the present invention, the modulation frame generator 320 generates a turbulence function with harmonics data from the parameters. The modulation frame generator 320 generates a plurality of noise frames with the turbulence function and sums the noise frames to form a turbulence frame. The turbulence frame is used as a modulation frame by the animation effect unit 300 where the coefficients in the turbulence frame determines a degree to change a color value in the source image. According to an alternate embodiment of the present invention, the modulation frame generator 320 generates a periodic, non-repeating function with frequency and amplitude data from the parameters. The modulation frame generator 320 generates a modulation frame using the output of the periodic, non-repeating function to determine a degree to shift pixels in the source image. It should be appreciated that parameters that generate other functions may be used to generate modulation frames.

An animation frame generator 330 is coupled to the interface unit 310 and the modulation frame generator 320. The animation frame generator 330 receives the source image from the interface unit 310 and the modulation frame from the modulation frame generator 320. Upon receiving instructions to generate an animation frame, the animation frame generator 330 applies the modulation frame to the source image to generate an animation frame.

The interface unit 310, modulation frame generator 320, and the animation frame generator 330 may be implemented using any known circuitry or technique. In an embodiment of the present invention where the animation effect unit 300 is implemented in hardware, the interface unit 310, the modulation frame generator 320, and the animation frame generator 330 all reside on a single semiconductor substrate.

The present invention reduces the bandwidth required for delivering animation from the second computer system 120 (shown in FIG. 1) to the first computer system 110 (shown in FIG. 1) by transmitting only animation data used to generate the animation on to the first computer system 110. The animation data may include parameters for generating a function and a source image. Transmitting animation data over the data transmission medium 150 requires less bandwidth than transmitting an animated GIF file or a Java applet. Animation frames are generated on the fly, in real-time, at the first computer system 110 using the animation data. The animation frames are generated at the first computer system 110 by perturbing the source image with the function.

Figure 4:
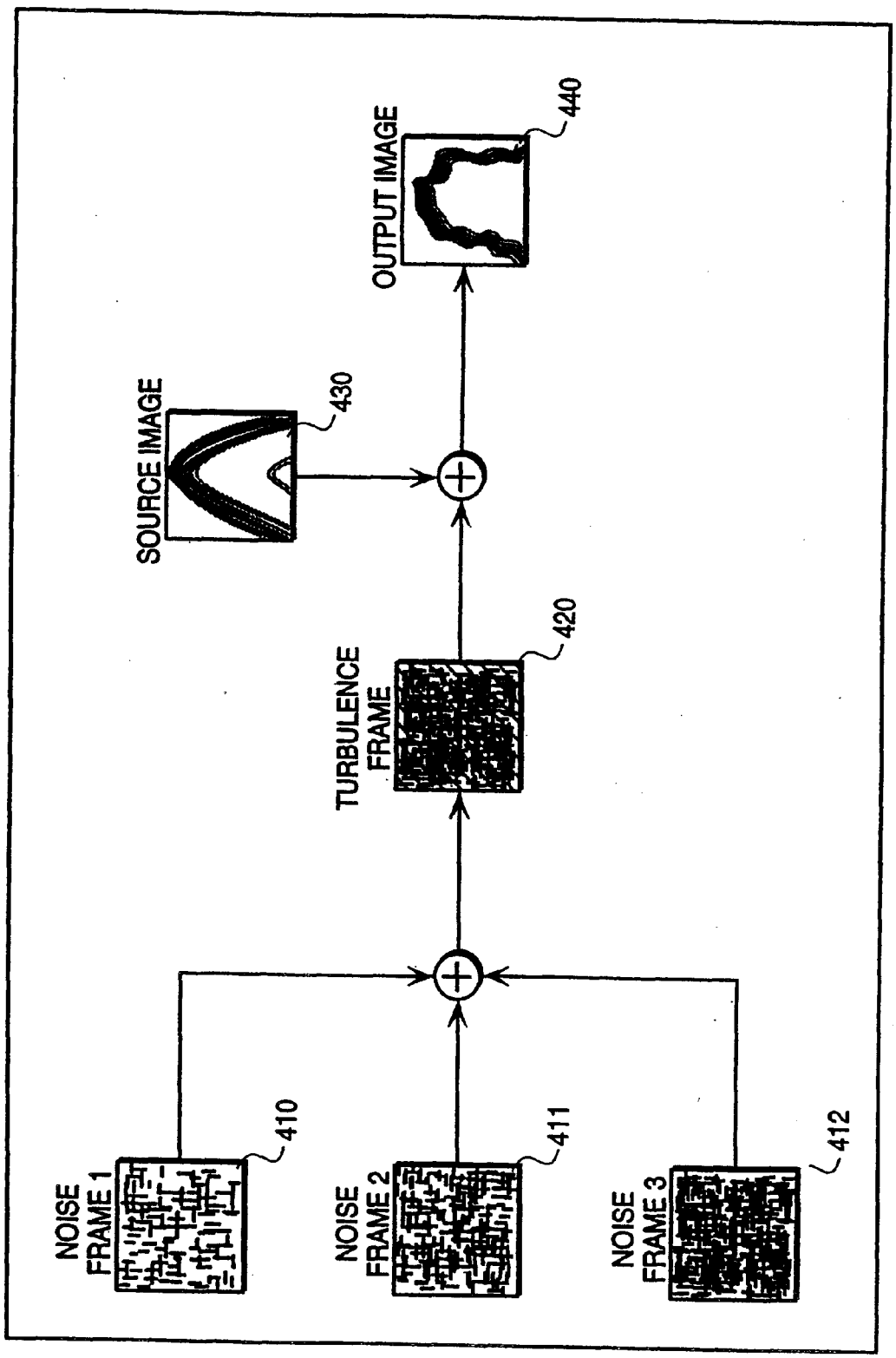
FIG. 4 illustrates how an animation frame is generated according to an embodiment of the present invention.

FIG. 4 illustrates how an animation frame is generated according to an embodiment of the present invention where a turbulence function is used to generate modulation frames. Noise frame 1 410, noise frame 2 411, and noise frame 3 412 are generated by the modulation frame generator 320 (shown in FIG. 3) and are summed together to form turbulence frame 420. The turbulence frame 420 is applied to the source image 430 by the animation frame generator 330 (shown in FIG. 3) to form an output image 440 used as an animation frame.

Figure 5:
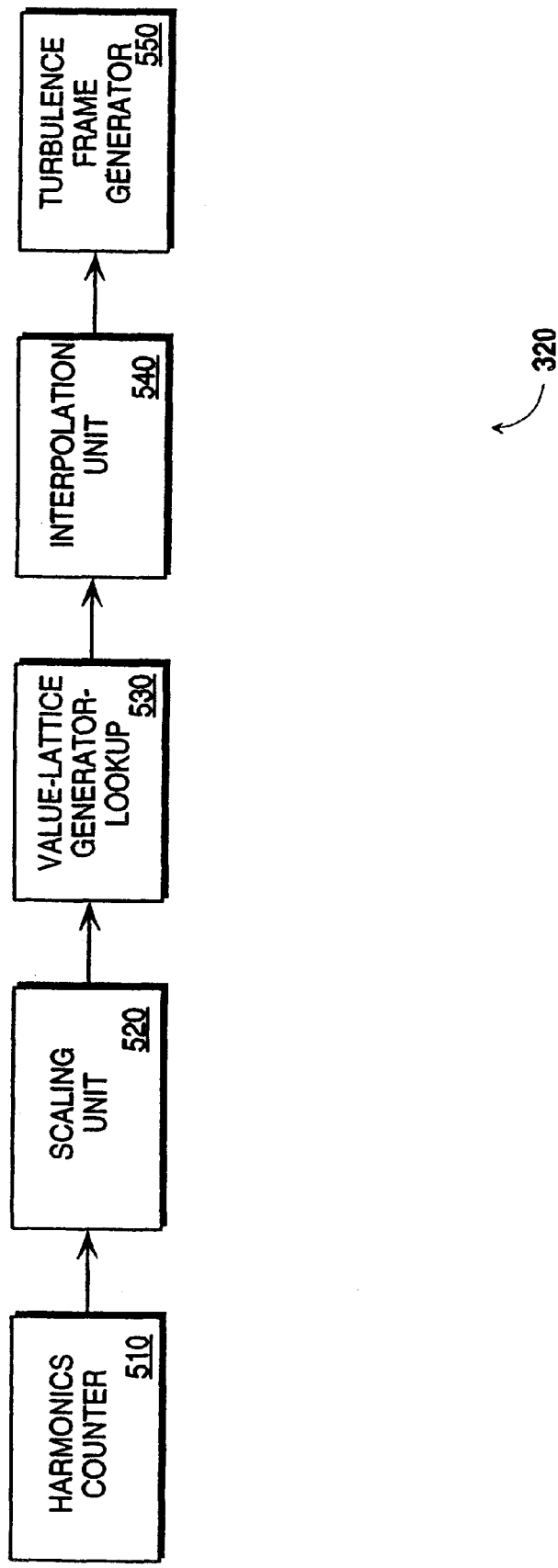
FIG. 5 illustrates a modulation frame generator according to an embodiment of the present invention.

FIG. 5 illustrates a modulation frame generator 320 according to an embodiment of the present invention. The modulation frame generator 320 includes a harmonics counter 510. The harmonics counter 510 receives harmonics data from the interface unit 310. The harmonics data includes a number of sets of harmonics to be generated and pixel coordinate scaling values. For each desired harmonic, the harmonics counter 510 generates a set of scaling values. Each set of harmonics may be used to generate a noise frame.

A scaling unit 520 is coupled to the harmonics counter 510. The scaling unit 520 receives the set of scaling values from the harmonics counter 510 (shown in FIG. 3). For every pixel coordinate on a noise frame that the modulation frame generator 320 generates, the scaling unit 520 scales the pixel coordinates according to the set of scaling values.

A value-lattice noise generator-lookup 530 is coupled to the scaling unit 520. The value-lattice noise generator 530 receives the scaled pixel coordinates from the scaling unit 520 and generates vertices for the value-lattice noise using the scaled pixel coordinates. The vertices for the value-lattice noise is generated once per animation. The value-lattice noise generator-lookup 530 selects noise values from the generated value-lattice noise to pass to an interpolation unit 530. It should be appreciated that a value-lattice noise may be generated each time a single interpolation noise value is to be produced, wherein the value-lattice noise generated is identical for a given set of scaled pixel coordinates. Alternatively, instead of selecting noise values from the generated value-lattice noise, previously selected noise values may be reused.

The interpolation unit 540 is coupled to the value-lattice noise generator unit 530. The interpolation unit 540 receives the selected noise values from the generated value-lattice noise. The interpolation unit 540 interpolates between the various input noise values to produce a single interpolated noise value.

A turbulence frame generator 550 is coupled to the interpolation unit 530. The turbulence frame generator 550 receives the noise values produced by the interpolation unit 540 and adds it to the value in the location of the current unscaled pixel coordinates. After the turbulence frame generator 550 is finished with the interpolated noise value, it returns control to the harmonics counter 510 if there are more harmonics to process for the current pixel location or if there are no new pixel locations to calculate. If the current turbulence frame is complete, control is handed to the animation frame generator 330 (shown in FIG. 3).

It should be appreciated that the harmonics counter 510, scaling unit 520, value-lattice generator 530, interpolation unit 540, and the turbulence frame generator 550 may be connected together in a manner different than the one shown in FIG. 5. The harmonics counter 510, scaling unit 520, value-lattice generator 530, interpolation unit 540, and the turbulence frame generator 550 may be implemented using any known circuitry or technique. In an embodiment of the present invention where the modulation frame generator 320 is implemented in hardware, the harmonics counter 510, scaling unit 520, value-lattice generator 530, interpolation unit 540, and the turbulence frame generator 550 all reside on a same semiconductor substrate.

Figure 6:
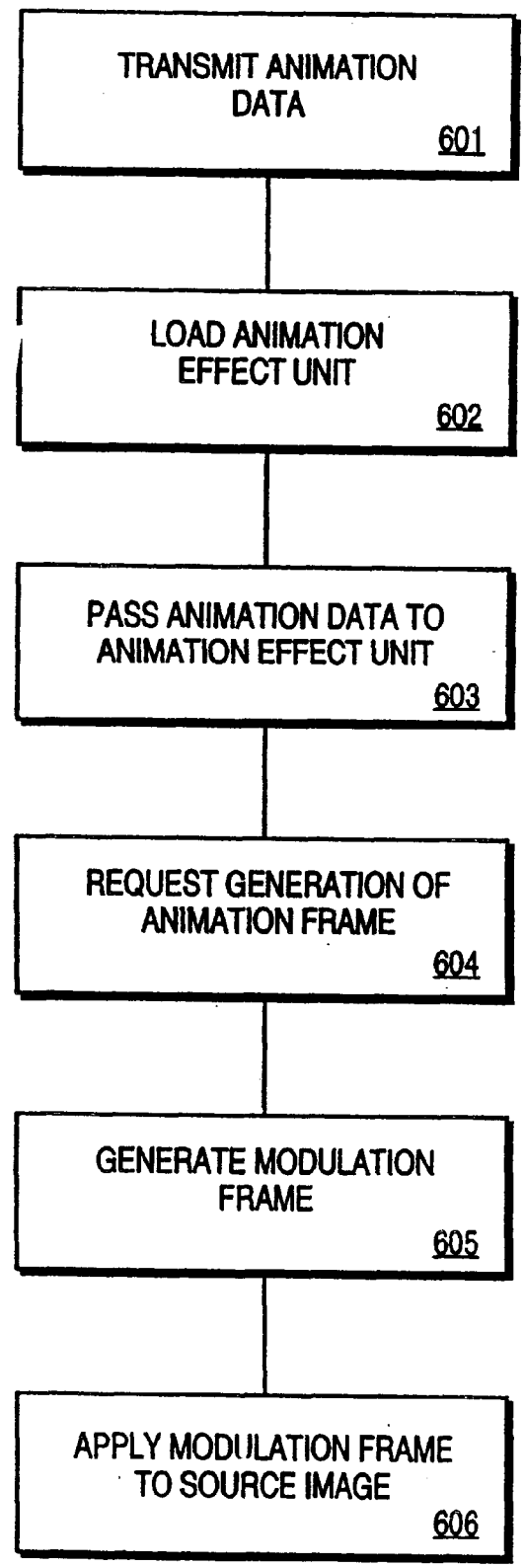
FIG. 6 is a flow chart illustrating a method for delivering animation according to an embodiment of the present invention.

FIG. 6 is a flow chart illustrating a method for delivering animation according to an embodiment of the present invention. At step 601, animation data is transmitted from a second computer system to a first computer system. The animation data may be transmitted over the Internet, an internal network connection, or other connections.

At step 602, an animation effect unit is loaded into memory. According to an embodiment of the present invention, the animation effect unit may be a plug-in that resides in a data storage unit of the first computer system. Alternatively, the animation effect unit may be implemented in hardware and would not require loading.

At step 603, the animation data is passed to the animation effect unit. According to an embodiment of the present invention, the animation data includes a single source image and parameters for generating a function. It should be appreciated that the animation data may also include additional data that determines how the modulation frames are applied to the source image and/or a mask image. It should also be appreciated that instead of including actual parameters and a source image, the animation data, may include an address of a location where the parameters and/or source image may be downloaded. It should also be appreciated that in situations where an animation does not require a source image a source image may not be included in the animation data.

At step 604, a request to generate a frame of animation is transmitted to the animation effect unit. According to an embodiment of the present invention, the request is generated from a web browser on the first computer system that is executing a file calling for the animation.

At step 605, a modulation frame is generated with the function. According to an embodiment of the present invention, generating a modulation frame is achieved by generating a plurality of noise frames with the function and summing the noise frames to form a turbulence frame. According to an alternate embodiment of the present invention, generating a modulation frame is achieved by plotting degrees of shifting with outputs of the function.

At step 606, the animation effect unit applies the modulation frame to the source image to generate an animation frame. In situations where the animation does not require a source image the modulation frame is defined as the animation frame.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than a restrictive sense.

What is claimed is:

1. An animation effect unit comprising:
   an interface unit to receive animation data comprising an indication of a source image and modulation frame generating parameters from a networked computer system;
   a modulation frame generator coupled with the interface unit to generate a plurality of modulation frames with the modulation frame generating parameters by evaluating a modulation frame generating function with the parameters; and
   an animation frame generator coupled with the modulation frame generator to generate a plurality of animation frames by combining the plurality of modulation frames with an indicated source image.

2. The animation effect unit of claim 1, wherein the modulation frame generator comprises a modulation frame generator to:
   generate a plurality of noise frames by evaluating a turbulence function; and
   generate a turbulence modulation frame by summing the plurality of noise frames.

3. The animation effect unit of claim 2,
   wherein the interface unit comprises an interface unit to receive harmonics data; and
   wherein the modulation frame generator comprises a modulation frame generator to generate a noise frame by evaluating a turbulence function with the harmonics data.

4. The animation effect unit of claim 1, wherein the modulation frame generator comprises a modulation frame generator to continue to generate unique modulation frames on the fly and in real-time for a length of time that is not predetermined.

5. The animation effect unit of claim 1, wherein the modulation frame generator comprises:
   a harmonics counter to receive harmonics data from the interface unit and to generate a set of scaling values;
   a scaling unit coupled with the harmonics counter to receive the generated set of scaling values and to scale a coordinate of a pixel on a noise frame based on the scaling values;
   a value-lattice noise generator-lookup coupled with the scaling unit to receive the scaled pixel coordinate and to generate a vertice for the value-lattice noise using the scaled pixel coordinates by selecting a plurality of noise values from a generated value-lattice noise, wherein the generated value-lattice noise is identical for a given set of scaled pixel coordinates;
   an interpolation unit coupled with the value-lattice noise generator-lookup to receive the selected plurality of noise values and to produce an interpolated noise value by interpolating between the plurality of noise values; and
   a turbulence frame generator coupled with the interpolation unit to receive the interpolated noise value and add the value to a value corresponding to the unscaled pixel coordinate.

6. The animation effect unit of claim 1,
   wherein the interface unit comprises an interface unit to receive modulation frame generating parameters operable to determine a degree to change a color value of a pixel in the source image; and
   wherein the modulation frame generator comprises a modulation frame generator to determine a degree to change a color value of a pixel in the source image by evaluating a function using the parameters.

7. The animation effect unit of claim 1, wherein the modulation frame generator comprises a modulation frame generator to generate a modulation frame by evaluating a periodic non-repeating function with the parameters.

8. The animation effect unit of claim 7, wherein the modulation frame generator comprises a modulation frame generator to generate a modulation frame by evaluating a periodic non-repeating function with frequency and amplitude data from the parameters.

9. The animation effect unit of claim 1, implemented as a plug-in residing in a memory of a computer system.

10. The animation effect unit of claim 1, implemented in hardware.

11. The animation effect unit of claim 1, wherein the modulation frame generating function is not included in the animation data.

12. The animation effect unit of claim 1, wherein the interface unit receives animation data from a browser.

13. The animation effect unit of claim 12, wherein the browser is not contained in an operating system.

14. A computer system comprising:
    a network controller to receive animation data by providing a link to a network;
    at least one PCI bus to transmit animation data;
    a processor coupled with the at least one bus to execute animation instructions;
    an animation effect unit coupled with the at least one bus comprising an interface unit to receive an indication of a source image and modulation frame generating parameters, a modulation frame generator coupled with the interface unit to generate a plurality of modulation frames with the modulation frame generating parameters by evaluating a modulation frame generating function with the parameters, and an animation frame generator coupled with the modulation frame generator to generate a plurality of animation frames by combining the plurality of modulation frames with an indicated source image; and
    a display device coupled with the animation effect unit to display the plurality of animation frames.

15. The computer system of claim 14, wherein the modulation frame generator comprises a modulation frame generator to generate a modulation frame by evaluating a periodic non-repeating function with frequency and amplitude data from the parameters.

16. The computer system of claim 14, wherein the indication of the source image includes an address indicating a location of the indicated source image.

17. The computer system of claim 14, wherein the modulation frame generating function is not included in the animation data.

18. The computer system of claim 14, wherein the modulation frame generator comprises a modulation frame generator to:
   generate a plurality of noise frames by evaluating a turbulence function; and
   generate a turbulence modulation frame by summing the plurality of noise frames.

19. The computer system of claim 14, wherein the modulation frame generator comprises a modulation frame generator to continue to generate unique modulation frames on the fly and in real-time for a length of time that is not predetermined.

20. The computer system of claim 14, wherein the computer system comprises a personal computer.

21. The computer system of claim 14, wherein the interface unit receives animation data from a web browser.

22. A method comprising:
   enabling reception of animation data including an indication of a source image and animation parameters from a networked computer system;
   enabling generation of a plurality of animation frames by enabling evaluation of an animation function with the animation parameters; and
   enabling generation of animation by enabling application of the plurality of animation frames with an indicated source image.

23. The method of claim 22, wherein enabling reception of animation data does not comprise enabling reception of the animation function.

24. The method of claim 22,
   wherein enabling reception of animation data comprises enabling reception of the indicated source image and modulation frame generating parameters from a web browser;
   wherein enabling generation of a plurality of animation frames comprises enabling generation of a plurality of modulation frames by enabling evaluation of a modulation frame generating function with the modulation frame generating parameters; and
   wherein enabling generation of animation comprises enabling application of the plurality of modulation frames to the received source image.

25. The method of claim 24, wherein enabling generation of a plurality of modulation frames comprises enabling generation of plurality of noise frames by enabling evaluation of a turbulence function and enabling summing the plurality of noise frames.

26. The method of claim 22, wherein enabling generation of animation comprises enabling generation of animation on the fly and in real time for a length of time that is not predetermined by continuing to generate unique modulation frames on the fly and in real time.

27. An article of manufacture comprising a computer-readable medium containing a sequence of instructions stored thereon that if executed cause a computer to:
   enable reception of animation data including an indication of a source image and animation parameters from a networked computer system;
   enable generation of a plurality of animation frames by enabling evaluation of an animation function with the animation parameters; and
   enable generation of animation by enabling application of the plurality of animation frames with an indicated source image.

28. The article of manufacture of claim 27, wherein the instructions to enable generation of a plurality of animation frames further comprise instructions that if executed cause the computer to evaluate a pre-existing animation function that was not received with the animation data.

29. The article of manufacture of claim 27,
   wherein the instructions to enable reception of animation data further comprise instructions that if executed cause the computer to enable reception of the source image and modulation frame generating parameters from a web browser;
   wherein the instructions to enable generation of a plurality of animation frames further comprise instructions that if executed cause the computer to enable generation of a plurality of modulation frames by enabling evaluation of a modulation frame generating function with the modulation frame generating parameters; and
   wherein the instructions to enable generation of animation further comprise instructions that if executed cause the computer to enable application of the plurality of modulation frames to the received source image.

30. The article of manufacture of claim 27, wherein the instructions to enable generation of a plurality of modulation frames further comprise instructions that if executed cause the computer to enable generation of a plurality of noise frames by enabling evaluation of a turbulence function and enabling summing the plurality of noise frames.

31. The animation effect unit of claim 1, implemented as a combination of hardware circuitry and software instructions.

32. The animation effect unit of claim 1, wherein the indication of the source image includes an address indicating a location of the source image.

33. The animation effect unit of claim 1, wherein the modulation frame generator comprises a harmonics counter means for receiving harmonics data and generating scaling values.

34. The animation effect unit of claim 1, wherein the modulation frame generator comprises a scaling unit means for receiving scaling values and scaling pixel coordinates.

35. The animation effect unit of claim 1, wherein the modulation frame generator comprises a value-lattice generator lookup means for receiving scaled pixel coordinates and generating vertices using the coordinates.

36. The animation effect unit of claim 1, wherein the modulation frame generator comprises an interpolation means for receiving a plurality of noise values and interpolating the plurality of noise values to produce a single interpolated noise value.

37. The animation effect unit of claim 1, wherein the modulation frame generator comprises a turbulence frame generator means for receiving an interpolated noise value and adding the value to a value in a location of a current unscaled pixel coordinate.

38. The animation effect unit of claim 5, wherein the harmonics counter, the scaling unit, the value-lattice noise generator-lookup, the interpolation unit, and the turbulence frame generator reside on a single semiconductor substrate.

39. The animation effect unit of claim 10, wherein the hardware comprises hardware circuitry residing on a single semiconductor substrate.

40. The computer system of claim 14, wherein the modulation frame generating function is not included in the animation data.

41. The computer system of claim 21, wherein the browser is not included in an operating system.

* * * * *